Sept. 8, 1964   J. H. REILLY   3,147,514
PROCESSING PLASTIC AND OTHER MULTIPHASE MATERIALS
Filed March 13, 1961   4 Sheets-Sheet 1

John H. Reilly
INVENTOR.

BY Eugene O. Farley
Atty.

Sept. 8, 1964 J. H. REILLY 3,147,514
PROCESSING PLASTIC AND OTHER MULTIPHASE MATERIALS
Filed March 13, 1961 4 Sheets-Sheet 2

John H. Reilly
INVENTOR.

BY Eugene D. Farley

Atty.

John H. Reilly
INVENTOR.

Sept. 8, 1964  J. H. REILLY  3,147,514
PROCESSING PLASTIC AND OTHER MULTIPHASE MATERIALS
Filed March 13, 1961  4 Sheets-Sheet 4

John H. Reilly
INVENTOR.

BY *Eugene D. Farley*

*Atty.*

3,147,514
PROCESSING PLASTIC AND OTHER MULTI-PHASE MATERIALS
John H. Reilly, Gresham, Oreg., assignor to Industrial Polymer, Inc., Shelton, Wash., a corporation of Washington
Filed Mar. 13, 1961, Ser. No. 95,081
10 Claims. (Cl. 18—2)

This invention relates to apparatus for processing plastic or other multiphase materials. It pertains particularly to apparatus for mixing, compounding, degassing and extruding, in a single operation, plastic materials such as "Saran," Teflon," "Kel-F," natural and synthetic rubbers, and similar materials which normally are difficult to process, using conventional methods and apparatus.

Although the invention is described herein with particular reference to plastic materials of the indicated types, it also is applicable to the processing of plastic materials of non-resinous origin, such as ceramic mixes, paints, fibrous molding mixtures, dryblend food stuffs and feeds, and the like. It is further applicable as a chemical reactor for heterogenous or multiphase systems.

In the manufacture from dry plastic raw materials of extruded shapes such as pipes, bars, rods, sheets, films, cable and wire covers, monofilaments and textile yarns it is necessary first to mix the plastic raw material, filler, plasticizer, pigment and other components of the extrusion mixture, to compound these components until a uniform and degassed blend has been achieved, and then to extrude the blend into the desired shape.

This sequence is difficult of accomplishment and usually requires three separate operations. The components of many plastic extrusion mixtures in the dry condition stubbornly resist being blended together into a uniform, coherent mixture. Also, it is extremely difficult to remove air or other gas which may be incorporated in the blend by being introduced with the starting materials, or by being entrained as they are mixed together.

Substantially complete removal of gas before extrusion of the plastic is of the utmost importance if satisfactory extrusion is to be obtained. The reason for this is that in order to form an extruded product of uniform high quality and predetermined dimensions, the flow of the plastic mixture through the extrusion die must be a truly plug-type flow, as opposed to streamline flow. The former is characteristic of an incompressible fluid such as a solution of soap in water, or a plastic mixture containing no entrained gas bubbles. The latter is characteristic of a non-homogeneous fluid such as a foamed soap solution, or a plastic mixture containing entrained air bubbles.

Extrusion of a thoroughly and uniformly worked plastic free of entrained air or other gases and characterized by plug flow leads to the production of an extruded object of uniform composition and properties, having the precise dimensions defined by the extruding die and free of localized residual strains. Extrusion of a plastic mixture containing entrained air bubbles and characterized by streamline flow leads to the production of an extruded object of non-uniform composition and properties, which swells to varying degree after leaving the die and hence does not have the dimensions sought to be predetermined by die selection.

The transition from streamline to plug flow with the removal of entrained air from a plastic mix is not, as might be supposed, a gradual change. The presence of even a relatively small amount of trapped gas in the form of minute bubbles is sufficient to prevent the transition. Removal of the small residual quantities of gas necessary to achieve it is made extremely difficult since the bubbles are so small, and since the work required to remove them increases markedly with decrease in bubble size, surface tension being an inverse function of sphere diameter.

Once accomplished, however, removal of almost all of the trapped gas has an immediate and astonishing effect on flow properties. The removal of even minute quantities of entrapped gas transforms a plastic mixture from one which is slightly compressible and possesses streamline flow, unsatisfactory for extrusion, to one which is virtually incompressible and characterized by plug flow, which may be extruded with eminent success. This is indicative of the fact that a physico-chemical change is involved in the removal of gas bubbles of microscopic and submicroscopic dimensions.

Such removal has an effect on the flow qualities of the mixture which is of a magnitude usually associated with chemical change. Application of the phase rule ($F=C-P+2$) is of interest in this connection. Elimination of the free gas increases the number of degrees of freedom of the system by one, but without change in the number of components since a certain proportion of gas would remain in the system in the adsorbed state, but not in the form of bubbles. Hence it is reasonable to assume that virtual disappearance of the gas phase from a plastic mixture accounts for the remarkable change in its flow properties.

Thus it is apparent that it is critically important to the success of an extrusion operation that the plastic mixture be free from bubbles and capable of plug flow. If it is not, the extruded object will swell to non-uniform dimensions after leaving the die, often necessitating curing an extruded plastic product under pressure to maintain its extruded dimensions. Also, it will be deficient in fatigue resistance, temperature rise on flexing, resistance to solvents, which follow lines of bubbles oriented in the extruded product, and other important properties.

In an attempt to achieve thorough mixing and compounding of extrusion mix components, and to attempt removal of gas bubbles therefrom, numerous expedients have been introduced into the prior art procedures for processing difficult plastic materials preliminary to their extrusion.

The most common has been that of mixing, compounding and extruding in separate operations, the first two being carried out batchwise and the product being fed as a ribbon or as coarsely ground pellets to an extruder. This obviously entails sharply increased costs for extra equipment and labor. Also, since the separate mixing and compounding stages require large, costly equipment, the operator of a medium sized extrusion plant finds it necessary to buy, at a premium, specially prepared feed materials for his extruders.

To remove air bubbles from a plastic to be fed to an extruder, it also has been a well known practice to add acetone or other solvent during compounding. The acetone reduces the skin effect so that the bubbles disperse more easily. This procedure obviously involves the cost of an additional ingredient. Furthermore, it requires removal of the solvent from the plastic, which is difficult.

It also is common practice to insert multiple orifices in the extruder ahead of the extrusion port. This forms a plurality of plastic streams which are fused together in an effort to get plug flow. However, this technique leads to the formation of an extruded product having "memory marks" along the lines of fusion, linearly oriented with respect to the extrusion. Such marks furnish points of structural weakness in the extruded article and to some extent, at least, are caused by relaxation of localized strains.

To achieve sufficient pressure for extrusion of thermoplastics the conventional single and multi-screw extrusion machines have long screws, e.g. 20 or 24 times the screw diameter, and must maintain close wall clearances of about 0.005 inch between the screw and casing. Breakage and wear accordingly are serious problems.

Since the articles prepared by the extrusion of plastic mixes containing gas bubbles will swell to varying degree after leaving the die, it is necessary, when making the die, to guess at a die dimension which will lead to the production of an extruded article of the desired final size. This obviously is inaccurate.

Acordingly it is the general object of the present invention to provide apparatus for processing plastic material which, in a single operation, will mix, compound, degas and extrude, in a homogeneous form, free of residual strains, dry powdered or pelletized components of plastic extrusion mixes, even though the plastics involved are stubborn, resistant materials such as "Saran," "Teflon," "Kel-F," and natural and synthetic rubber.

It is another important object of this invention to provide apparatus for processing plastic materials into an extrusion furnish characterized by freedom from bubbles of entrained gases, and hence by plug flow.

Other significant objects of my invention are the provision of apparatus for mixing, compounding, and extruding plastic materials which apparatus is simple in construction, small in size, relatively low in cost, easily maintained and repaired, efficient in its action, fast in operation (processing times of the order of 1 minute), non-injurious to the plastic by scorching or otherwise, operable at relatively low temperatures and with minimum attention, continuous in operation, and self-cleaning. The manner in which the foregoing and other objects of the invention are accomplished will be apparent from the accompanying specification and claims considered together with the drawings, in which:

FIGS. 1 and 2 are front elevations of the herein described apparatus for processing extrudable plastic materials, the cover of the apparatus being removed in FIG. 2;

FIGS. 3, 4, 6 and 7 are transverse sectional views taken along lines 3, 4, 6 and 7, respectively, of FIG. 1;

Figure 1:
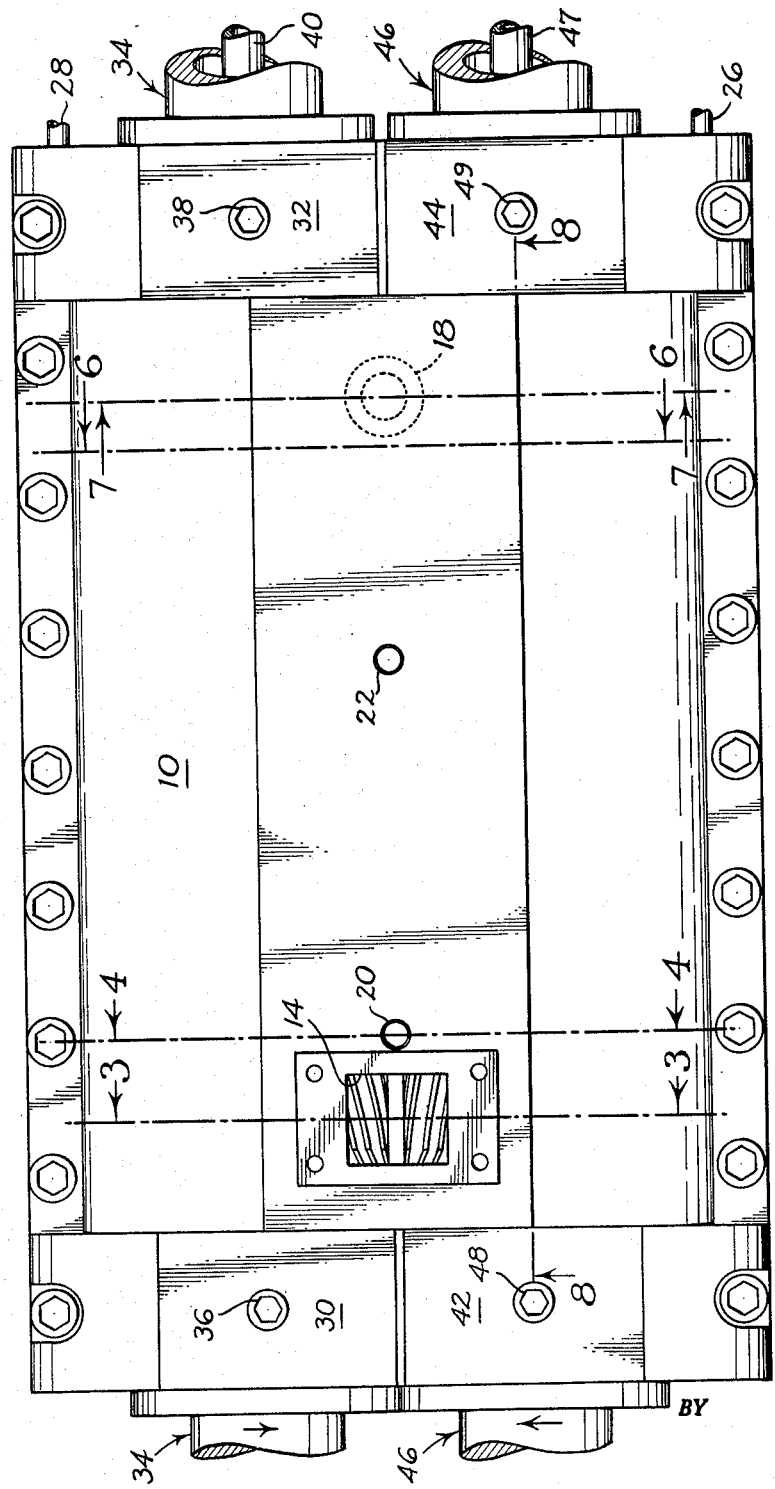

In its broadest aspect, the method of my invention for processing materials comprises providing a quantity or bank of the material, shearing off pieces from the bank, working the pieces for mixing their components and removing gas which may be present, and returning the worked pieces to the bank, the sequence being repeated until blending and degassing of the materials has been effectuated to the desired degree. This may be to the point at which the material becomes characterized by plug flow and hence may be extruded efficiently immediately following the mixing and compounding. The operations of mixing, compounding, degassing and extruding thus become but integrated stages of a unitary, continuous operation.

The apparatus of my invention, in its broadest concept, comprises means for effectuating the foregoing sequence of method steps. In addition, means may be provided for evacuating gas removed during the processing of the material, for carrying out the processing at a predetermined temperature, and for applying severe pressure to the material in process as may be required to blend and degas stubborn plastic materials which resist working.

The apparatus preferably comprises a pair of parallel rolls having opposite, inclined grooves in their peripheral surfaces. A shear is positioned between the rolls in close proximity to them, the cutting edge of the shear preferably being substantially coplanar with the axes of the rolls. As the rolls are driven in opposite directions, the shear and grooves coact to shear off small pieces of material. These are worked and returned to the bank of material while it is being advanced toward the discharge end of the machine. Baffles or other suitable means are present for mixing contemporaneously the body of the material in a gross or "end-to-end" manner, thereby achieving a thorough blending of the components and degassing of the mass.

Considering the foregoing in greater detail and with particular reference to the drawings:

The apparatus of my invention is housed in a casing formed in two sections 10, 11 which are keyed and bolted together to form a substantially sealed receptacle. It is to be noted that keys 12, 13 are arranged longitudinally and extend the full length of the casing. They serve to align the casing sections as well as to seal the interior. They are located as close to the inner margin of the casing sections as is practical in order to counteract the effect of the immense pressures developed within the casing, which otherwise would separate the casing sections and drive the plastic contents outwardly through the joints between the sections.

An inlet or feed port 14 is located near one end of the casing and an outlet or discharge port 18 at the other. The inlet port may be fitted with a plate, to which may be bolted a line for feeding solid pelletized or powdered plastic or other mixtures to be processed in the apparatus. The outlet port 18 may be threaded for attachment of an extrusion die, if a plastic extrusion process is contemplated.

Threaded openings 20, 22 penetrate the casing centrally for attaching means for evacuating the interior of the casing or for supplying gases or liquids under pressure as may be desired. Channels 24 are formed within the body of the casing for introducing temperature-controlling media through inlet 26 and outlet 28.

A first pair of bearings 30, 32 are located at opposite ends of the casing and mount rotatably the shaft of a first rotor or roll 34. This roll, and the associated bearings, are maintained in position by means of bolts 36, 38. The roll may be hollow (FIG. 2) and provided with a central conduit 40 for introduction of temperature-controlling media to the interior.

A second pair of bearings 42, 44 at the opposite end of the casing rotatably mount the shaft of a second roll 46, which lies adjacent and parallel to roll 34. Like the latter roll, roll 46 may be hollow and fitted with a central conduit 47 for the introduction of temperature-controlling media. The roll and bearings may be secured by adjustable bolts 48, 49.

Figure 5:
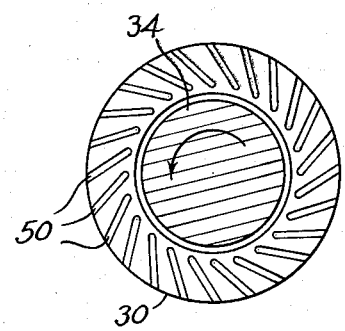
FIG. 5 is a detail sectional view taken along line 5—5 of FIG. 2.

The inner faces of the bearing housings, which form part of the end walls of the casing, or in the alternative the ends of rolls 34, 46 are formed, as indicated in FIG. 5, with a plurality of grooves 50 which lie substantially tangentially to the periphery of the roll and the outer ends of which dead end against casing sections 10, 11. As will appear later, these grooves afford a means of forcing outwardly, away from the roll shafts, any quantity of the material in process which inadvertently may find its way to the extreme end of the apparatus. The material thus is prevented from flowing along the roll shafts into the bearings, and in addition forms a seal which prevents movement of further quantities of the material in the direction of the bearings.

Shrunk or otherwise mounted on the shafts of rolls 34, 46 are a plurality of collars having peripheral surfaces provided with grooves or other structural features such that, when the collars are mounted end to end on the shafts, they form an integrated roll assembly capable of performing the desired functions. Since the rolls essentially are duplicates, with the exception that one is the mirror image of the other, this discussion is confined to the construction of roll 34.

Figure 2:
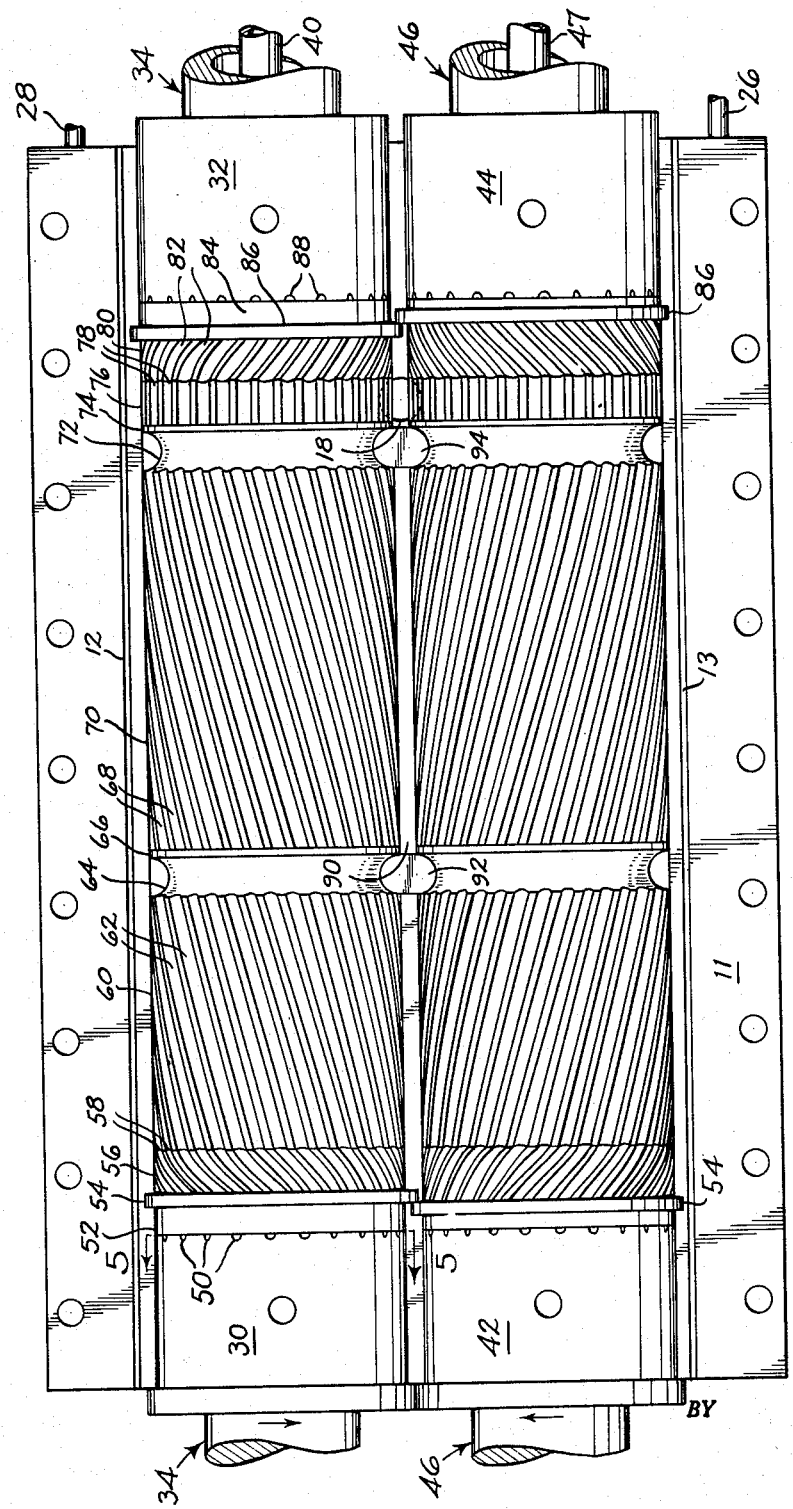

Considering the elements of the roll assembly, as viewed from left to right in FIG. 2, the first element is a section 52 provided with an annular sealing flange 54. The outer end of this section abuts and slides against the inner surface of the housing of bearing 30, equipped with grooves 50 as above described. Flange 54 overlaps and meets in sealing engagement a similar flange on roll 46, both flanges working in annular recesses on the inner walls of the casing members. An effective seal against working into bearings 30, 42 of the material in process thus is provided.

Next to sealing section 52 is a section 56 of relatively short extent. It lies opposite a corresponding section on roll 46. Its peripheral surface is formed with a plurality of grooves 58, the inclination of which is opposite to that of the grooves on the corresponding section of roll 46, as is the case also with the downstream grooved sections of the roll, to be described hereinafter.

Grooves 58 in part lie opposite inlet port 14 so that material fed through the port, pressing against the grooves, is given a sharp thrust in the forwarding direction, i.e. from left to right as viewed in FIG. 2. This feature further assists in preventing material from reaching bearings 30, 42 at the infeed end of the casing. Accordingly, the pitch of grooves 58 is relatively steep, e.g. from 30 to 60° with reference to the axis of the roll.

Figure 3:
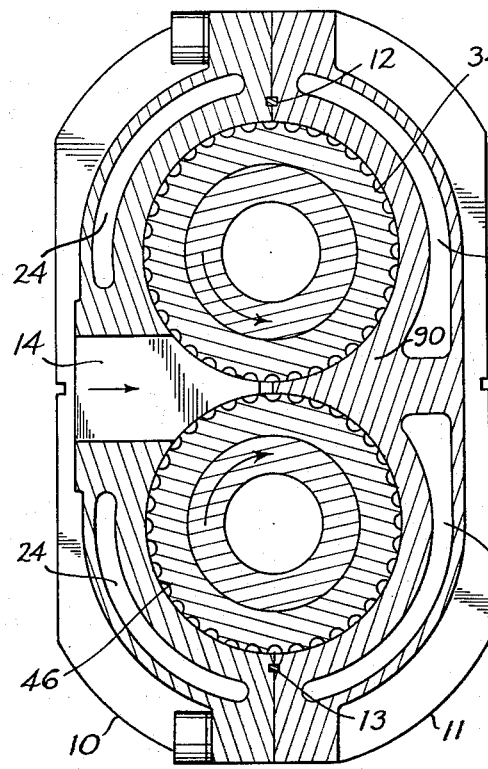
Figure 4:
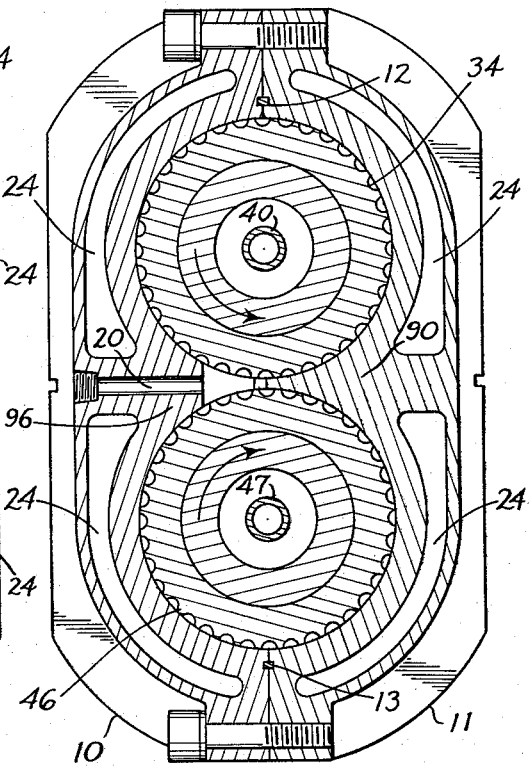

Abutting thrust section 56 is one of the major sections of the roll, section 60 (FIGS. 3 and 4) which lies opposide its counterpart on roll 46. The peripheral surface of this section is formed with a multiplicity of small, sharp edged grooves 62, the inclination of which is substantially less than that of grooves 58, being of the order of from 0–30° with respect to the roll axis. The function of this section is to assist in dividing the feed material into small pieces which are worked, blended, degassed and forwarded in the outfeed direction, as will be described later.

Roll section 60 is adjacent, and grooves 62 communicate with, an annular groove 64 of substantial crosss section. This groove interrupts the flow of material being processed by section 60 and achieves a gross mixing of it.

Next to groove 64 lies a stop 66 comprising an annular ring of sufficient diameter to close off the infeed ends of grooves 68 in the adjacent roll section 70.

Section 70, like section 60, comprises one of the major working sections of the roll, and grooves 68, like grooves 62, assist in shearing, mixing, blending and forwarding the feed toward outlet 18.

Figures 6, 7:
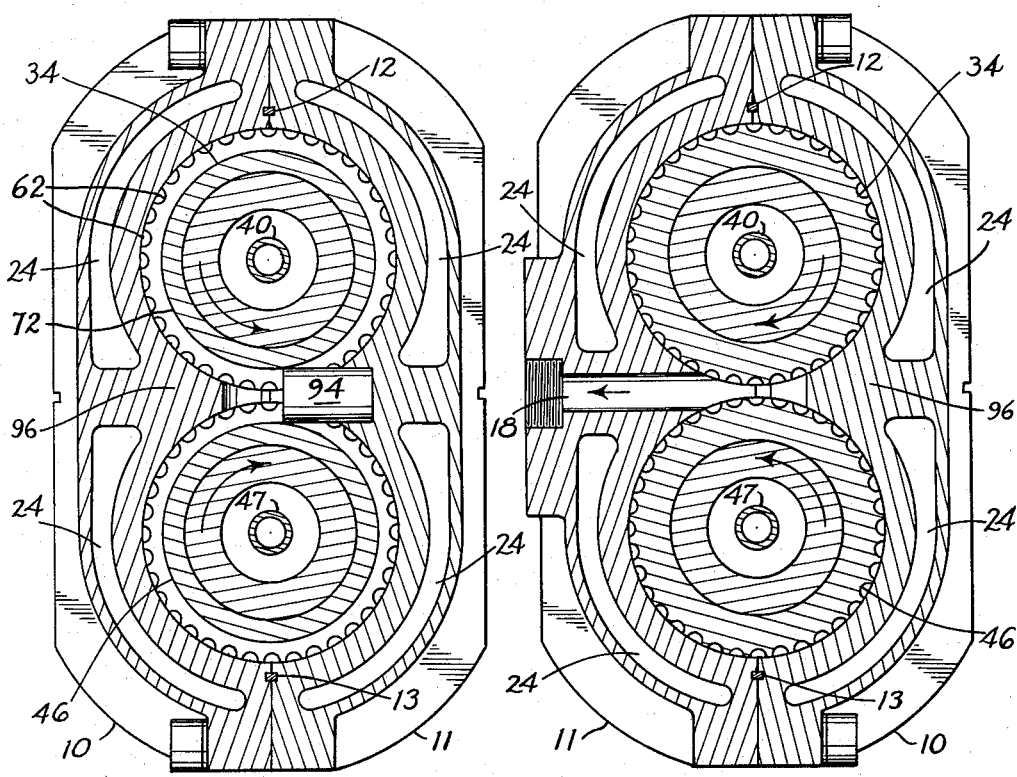

Grooves 68 feed into an annular groove 72 (FIG. 6) analogous in construction and function to annular groove 64. That is, it interrupts the flow of the material and in conjunction with the succeeding elements of the roll, effectuates a gross or end-to-end mixing of it.

Downstream from annular groove 72 is a stop segment 74 which is analogous to segment 66 described above. It abuts an extruding segment 76 (FIG. 2) which is directly opposite outfeed port 18 and the grooves 78 of which preferably are substantially parallel to the roll axis. Such grooving assists in extruding the material through the port, if an extrusion operation is contemplated.

Next follows a thrust section 80 which is analogous to section 56, above described, in that its function is to hinder access of the material to the end bearing areas. However, the pitch of its sharply inclined grooves 82, is the reverse of that of grooves 58 in section 56. The result is to move the material in a reverse direction, away from bearing 32.

Section 84, provided with sealing flange 86, follows. These elements are analogous to section 52 and flange 54 at the opposite end of the roll, further preventing access of the material to the bearings.

Section 84 abuts against the end wall of bearing 32. This wall, like the end wall of bearing 30, is provided with tangential grooves 88 leading outwardly and serving as conduits to convey away from the bearing shafts any small quantity of material which may have passed the various barriers interposed between the bearings and the outlet port, and to form a seal of it.

As indicated above, the construction of roll 46 is essentially similar to that of roll 34 with the exception that the inclination of the grooving is opposite. Both of these rolls coact with shear means in effectuating the purposes of the invention.

The shear means employed comprises an elongated shearing member 90 which is interposed between rolls 34, 46 and which extends substantially from one end to the other of the apparatus. It may be formed integrally with the housing, as is indicated in the sectional views, for example in FIGS. 3 and 4. Preferably it is formed as an insert, removable for sharpening and replacement.

Figure 9:
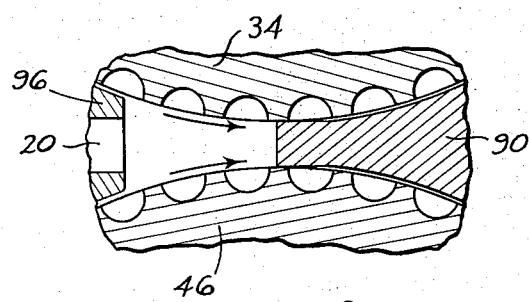
FIG. 9 is an enlarged, detail view in section, based on FIG. 4.

The top of the shear preferably is flat and is substantially coplanar with the axes of rolls 34, 46. The side walls of the shear are arcuate in contour, being concentric with the rolls and closely spaced thereto. In general the spacing between the side walls of the shear and the roll periphery is sufficient to accommodate but a film of the material in process. It thus may be of the order of 0.005 to 0.030 inch. The clearance between the shearing edges of the shear and the rolls, however, may be much more restricted, being of the order of 0.005 inch or less, as indicated in FIG. 9.

At stations opposite annular grooves 64, 72, the shear member is recessed for the accommodation of baffles 92, 94 (FIGS. 6 and 8) which are roughly elliptical in cross section and extend outwardly into grooves 64, 72, respectively. They serve as deflectors for guiding the flow of material contained in the grooves outwardly and forwardly into the adjacent sections of the apparatus.

Cooperating with shear member 90 is a partition 96 which, like the shear, may be formed integrally with the casing, but preferably is formed as a removable insert. Also, as in the case of the shear, the side walls of the partition are concentric with and in close proximity to the rolls, the clearance being of the order of 0.005 to 0.030 inch in a typical installation.

Figure 8:
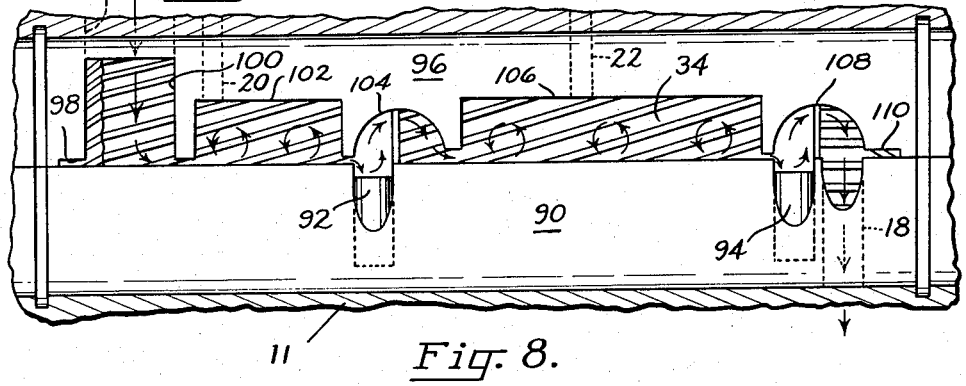
FIG. 8 is a longitudinal sectional view taken along line 8—8 of FIG. 1, looking in the direction of the arrows and with the lower roll removed.

The construction of partition 96 is seen best in FIG. 8 wherein one of the rolls only is shown in the background, the cooperating roll having been removed for purposes of illustration.

Considering the partition, as viewed from left to right, there first is evident a stepped section 98 which affords clearance for presentation of material introduced through inlet port 14 to thrust section 56 of the rolls, thereby insuring that a positive forwarding action immediately will be imparted to it.

Next is a sharply recessed section 100 which serves to pass material introduced through inlet port 14. Next is a recessed portion 102 which provides a chamber opposite working section 60 of the rolls. In this chamber, which may be maintained at atmospheric pressure or below, an accumulation of milling, rolling material, termed herein a "bank," is to be found.

Next, opposite annular groove 64, stop 66 and the leading margin of roll segment 70, is a recessed portion 104. This serves as a guide to direct the moving, turbulent material from section 60 to section 70 of the rolls. Next follows a recess 106 which lies opposite roll section 70 and corresponds in function to recessed section 102. It, too, provides a chamber, which may be maintained at atmospheric pressure, or below, for the accumulation of a quantity or "bank" of the material in process.

Recess 106 is followed by recess 108 which, like recess 104, has a curved surface and serves as a guide for guiding the material across annular groove 72, stop ring 74, and onto extrusion section 76. Stepped segment 110, lying opposite reversing roll segment 80, affords clearance for passage of material moved reversely by that segment.

Drive means, not illustrated, may be coupled in any desired manner to rolls 34, 46 for driving them in opposite directions, as indicated by the arrows of the drawings. Preferably the rolls are driven synchronously, although if desired they may be driven at different speeds of rotation.

*Operation*

The operation of the presently described apparatus for mixing, compounding, degassing and extruding solid plastic and other materials is as follows:

A flow of water or other temperature-controlling medium is circulated through rolls 34, 46 via conduits 40, 47 and through passageways 24 in the casing section for establishment of the desired temperature. Ports 20, 22 may be connected to a source of vacuum, if it is desired to evacuate gas as it is liberated from the material. An infeed line for feeding the raw materials, for example, a selected polymer, plasticizer, pigment and other desired compounding agents, is bolted to infeed port 14. An extrusion die is fixed to outlet port 18.

Rolls 34, 46 are driven at the selected rotational speeds. The feed material entering through port 14 first contacts portions of sections 56, 60 of the rolls. It is driven into grooves 62 of sections 60 primarily by the wedging action of the rolls.

As the rolls rotate, they draw the material against the upper surface of shear 90 which shears off pieces of the material under the very substantial pressure developed by the roll nip at the plane of the roll axes. The material in process thus is distributed in the grooves of the roll, as a film in the space between the rolls and the casing side walls, and as an accumulation or bank in the chambers 102, 106 directly opposite the rolls.

The shear achieved by the presently described apparatus is much more positive than that achieved by the usual screw extruder, or even by conventional milling rolls. It is much more intense not only because of the close approach of the stationary and rotary shearing members, but also because of the much higher order of exposure to the shearing action of the material being processed, an important consequence of the close spacing of the rotating shear members and the small volume of material contained in the multiplicity of grooves. In addition, the presently described apparatus produces a substantial shear between the roll peripheries and casing.

The total shear thus is of much greater intensity than that produced by the single or multi-screw compounding machines of the prior art. By contrast, for example, the usual extruder screw has only one or two flights and carries a high proportion of the processing material within the screw channels, where it turns over slowly and with but little shearing action.

Not only do the grooves of the rolls shear off pieces of material, but they also urge it forwardly, i.e. to the right in the manner shown in a general way by the arrows of FIG. 8, while contemporaneously working it as required to effect a thorough blending and degassing of the constituents. The gas, as it is liberated, is voided to chambers 102, 106, which may be at atmospheric pressure or lower and from which the gas is vented to the exterior through ports 20, 22.

After the material in the grooves and film has made a complete revolution, it again comes in contact with the body of the material in the material bank. There follows a substantial and repeated interchange between the rolls and the bank, part of the material in the grooves being returned to the bank and the rolls in turn shearing off new quantities of material which are introduced into the grooves. At the same time, the material is subjected to substantial and repeated pressure changes as it travels from the high pressure area behind the rolls to the low pressure environment of chambers 102, 106. This cyclic pressure change is of great assistance in securing substantially complete removal of the gas.

The material is forwarded until it comes to annular groove 64, backed up by stop ring 66. The material flowing into the groove is scooped out by baffle plug 92 and directed outwardly against the curved surface of recess 104 of partition 96 (FIG. 8). This guides it over stop ring 66 and onto the surface of roll section 70. A gross or end-to-end mixing of the material thus is achieved.

Section 70 of the rolls serves a mixing, compounding, and degassing function just as does section 60 thereof. Opposite section 70 is a chamber defined by recess 106 of partition 96 which houses another bank of the material at reduced pressure and being continually worked and interchanged by the rolls.

Next the material is forwarded into annular groove 72. This groove, with associated baffle 94 and stop ring 74, is analogous to groove 64 previously described. It effectuates a gross mixing of the material after which the material is guided onto extrusion section 76 of the rolls. These drive it under high pressure out of exit port 18 and through a selected extrusion die.

During the foregoing operations, material is prevented from penetrating bearings 30, 42 at the infeed side by sharply pitched roll thrust sections 56, sealing flanges 54, and tangential grooves 50. Similarly, it is prevented from penetrating bearings 32, 44 at the outfeed end of the apparatus by reversely pitched thrust sections 80, sealing rings 86, and tangential grooves 88. It is prevented from penetrating into the area between the meeting edges of the casing sections by longitudinally extending keys 12, 13.

As a consequence of the operations occurring within the apparatus, even dry, powdered feed mixtures of resistant plastic such as "Saran," "Kel-F," and "Teflon," together with the required quantities of filler, pigment and other components, may be mixed, compounded, and extruded continuously in a single operation in a single machine. Furthermore, the material is so completely degassed that the threshold is passed beyond which true plug flow of the material occurs. As a result, the extrusion dies may be cut precisely to dimension and the extruded products will be formed precisely to size.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. Apparatus for processing plastic and other multiphase materials which comprises a casing, a pair of parallel rolls rotatably mounted in the casing in working proximity to its inner walls, a multiplicity of oppositely inclined longitudinal grooves in the peripheral surfaces of the rolls, inlet and outlet ports at the respective ends of the casing, shear means placed between the rolls and extending longitudinally thereof, a chamber located between the rolls opposite the shear means, the chamber communicating with the inlet and outlet ports and adapted to contain a bank of the material, and drive means connected to the rolls for rotating them in opposite directions and for driving the material against the shear means, the shear means and grooves coacting to shear off small pieces of the material, to work them against the casing inner walls, and to return them to the bank while advancing the bank toward the outlet port.

2. The apparatus of claim 1 including spaced grooves between the casing and the roll ends, arranged substantially tangentially to the periphery of the rolls.

3. The apparatus of claim 1 wherein the longitudinal grooves on the infeed end sections of the rolls are pitched at a substantial angle to the roll axis, the pitch being in a material-forwarding direction.

4. The apparatus of claim 1 wherein the pitch of the longitudinal grooves on the body of the rolls is from 0° to 30° with reference to the roll axes, the pitch being in a material-forwarding direction.

5. The apparatus of claim 1 wherein the longitudinal grooves on the rolls are divided into at least two sections by interposed annular grooves in which are mounted baffle means for scraping out and grossly mixing the material contained in the annular grooves.

6. The apparatus of claim 1 wherein the longitudinal grooves on the body of the rolls are divided into sections by grooves of relatively large cross section arranged annularly, each section of the longitudinal grooves being separated from the annular groove immediately upstream from it by an annular stop.

7. The apparatus of claim 1 wherein the rolls are provided with sections opposite the outlet port in which sections the grooves are arranged substantially parallel with respect to the roll axes.

8. The apparatus of claim 1 wherein the rolls are provided at their outfeed ends, downstream from the outlet port, with sections wherein the grooves are sloped steeply in a material-reversing direction.

9. The apparatus of claim 1 wherein the working surface of the shear means is substantially coplanar with the roll axes.

10. The apparatus of claim 1 including a partition inserted between the rolls opposite the shear means, the partition being formed with guiding and baffle surfaces for achieving gross mixing of the material as it is worked toward the outlet port by the action of the rolls.

References Cited in the file of this patent

UNITED STATES PATENTS

| | | |
|---|---|---|
| 1,403,681 | Gordon | Jan. 17, 1922 |
| 2,048,286 | Pease | July 21, 1936 |
| 2,200,997 | Royle | May 14, 1940 |
| 2,434,707 | Marshall | Jan. 20, 1948 |
| 2,519,014 | Bankey | Aug. 15, 1950 |
| 2,519,834 | Hanson et al. | Aug. 22, 1950 |
| 2,543,307 | Swallow et al. | Feb. 27, 1951 |
| 2,615,199 | Fuller | Oct. 28, 1952 |
| 2,686,336 | Kleinlein et al. | Aug. 17, 1954 |
| 2,814,827 | Snow et al. | Dec. 3, 1957 |
| 2,910,726 | Parshall | Nov. 3, 1959 |
| 2,995,774 | Pasquetti | Aug. 15, 1961 |
| 3,010,151 | Dickinson et al. | Nov. 28, 1961 |

FOREIGN PATENTS

| | | |
|---|---|---|
| 104,210 | Great Britain | Feb. 23, 1917 |
| 503,875 | Italy | Dec. 7, 1954 |